United States Patent [19]
Claar

[11] 4,418,932
[45] Dec. 6, 1983

[54] FRONT AXLE SUSPENSION SYSTEM FOR A VEHICLE CHASSIS

[75] Inventor: Paul W. Claar, Ames, Iowa

[73] Assignee: Iowa State University Research Foundation, Inc., Ames, Iowa

[21] Appl. No.: 200,211

[22] Filed: Oct. 24, 1980

[51] Int. Cl.³ .............................................. B60G 9/02
[52] U.S. Cl. ................................. 280/112 R; 280/660
[58] Field of Search .................... 280/111, 688, 112 R, 280/672, 663, 660

[56] References Cited
U.S. PATENT DOCUMENTS

| 2,325,822 | 8/1943 | Whitmer | 280/111 X |
|---|---|---|---|
| 3,025,079 | 3/1962 | Gouirand | 280/672 X |
| 3,154,164 | 10/1964 | Shaw et al. | 280/111 X |
| 3,439,931 | 4/1969 | Setz | 280/688 |
| 3,827,518 | 8/1974 | Kuhl et al. | 280/492 X |
| 3,900,042 | 8/1975 | Unruh et al. | 280/688 X |
| 4,146,248 | 3/1979 | Chamberlain et al. | 280/688 |
| 4,179,135 | 12/1979 | Slater | 280/660 X |
| 4,279,319 | 7/1981 | Joyce, Jr. | 280/112 R X |

FOREIGN PATENT DOCUMENTS

| 965984 | 7/1957 | Fed. Rep. of Germany | 280/660 |
|---|---|---|---|
| 1098376 | 1/1961 | Fed. Rep. of Germany | 280/112 R |
| 1471948 | 3/1967 | France | 280/112 R |
| 532074 | 9/1955 | Italy | 280/663 |
| 55-102714 | 8/1980 | Japan | 280/112 R |
| 1085479 | 10/1967 | United Kingdom | 280/688 |

Primary Examiner—Joseph P. Brust

[57] ABSTRACT

A front axle suspension system for a vehicle chassis includes first and second links pivotally connected to the chassis and extending downwardly therefrom, the second link being positioned rearwardly of the first link. A coupler link is pivotally connected to the lower ends of the first and second links and extends forwardly from them. The front axle is connected to the coupler link and is adapted to carry a front wheel for rotation about a generally horizontal centerline. A spring and dampener mechanism interconnects the coupler link and chassis to yieldably resist movement of the axle relative to the chassis. The pivotal connections of the first, second and coupler links are so arranged that the instantaneous center of the suspension system will always be below and rearwardly of the front wheel centerline.

4 Claims, 8 Drawing Figures

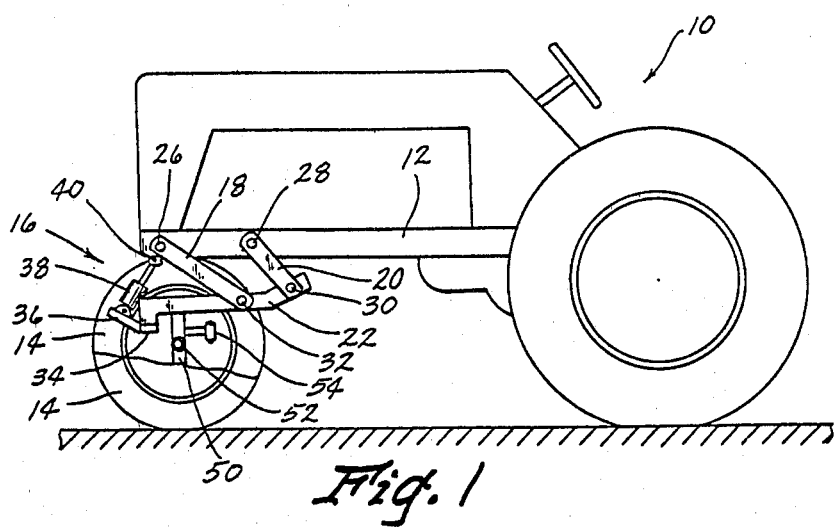
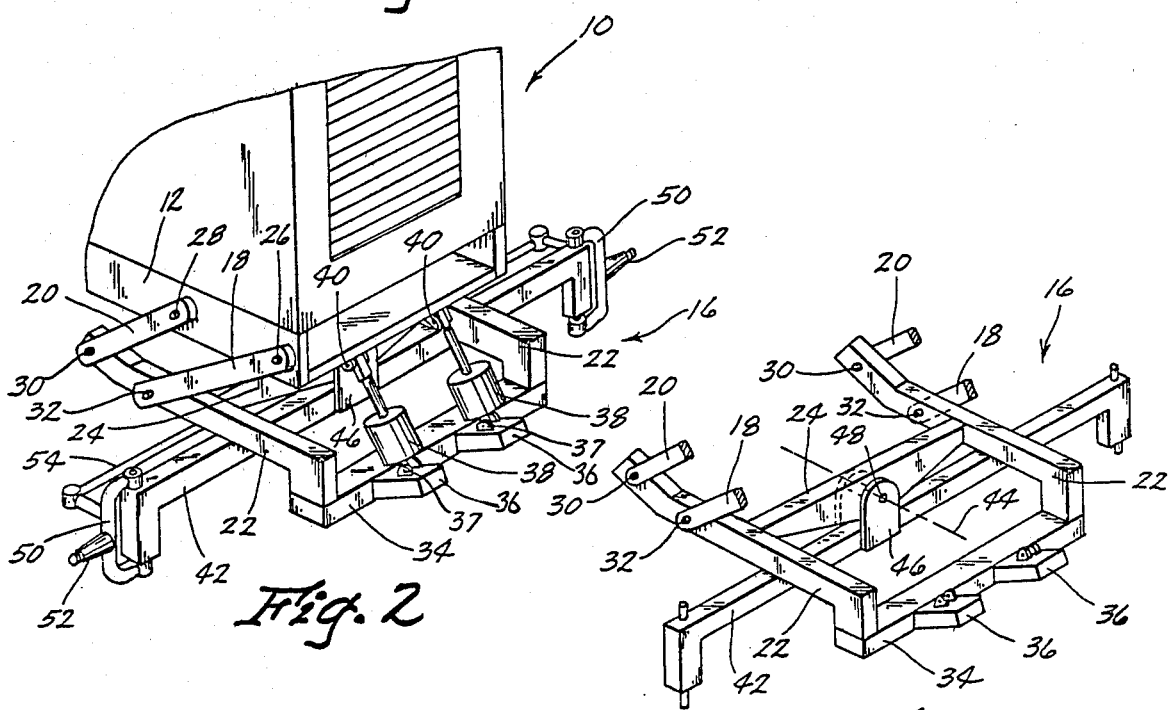

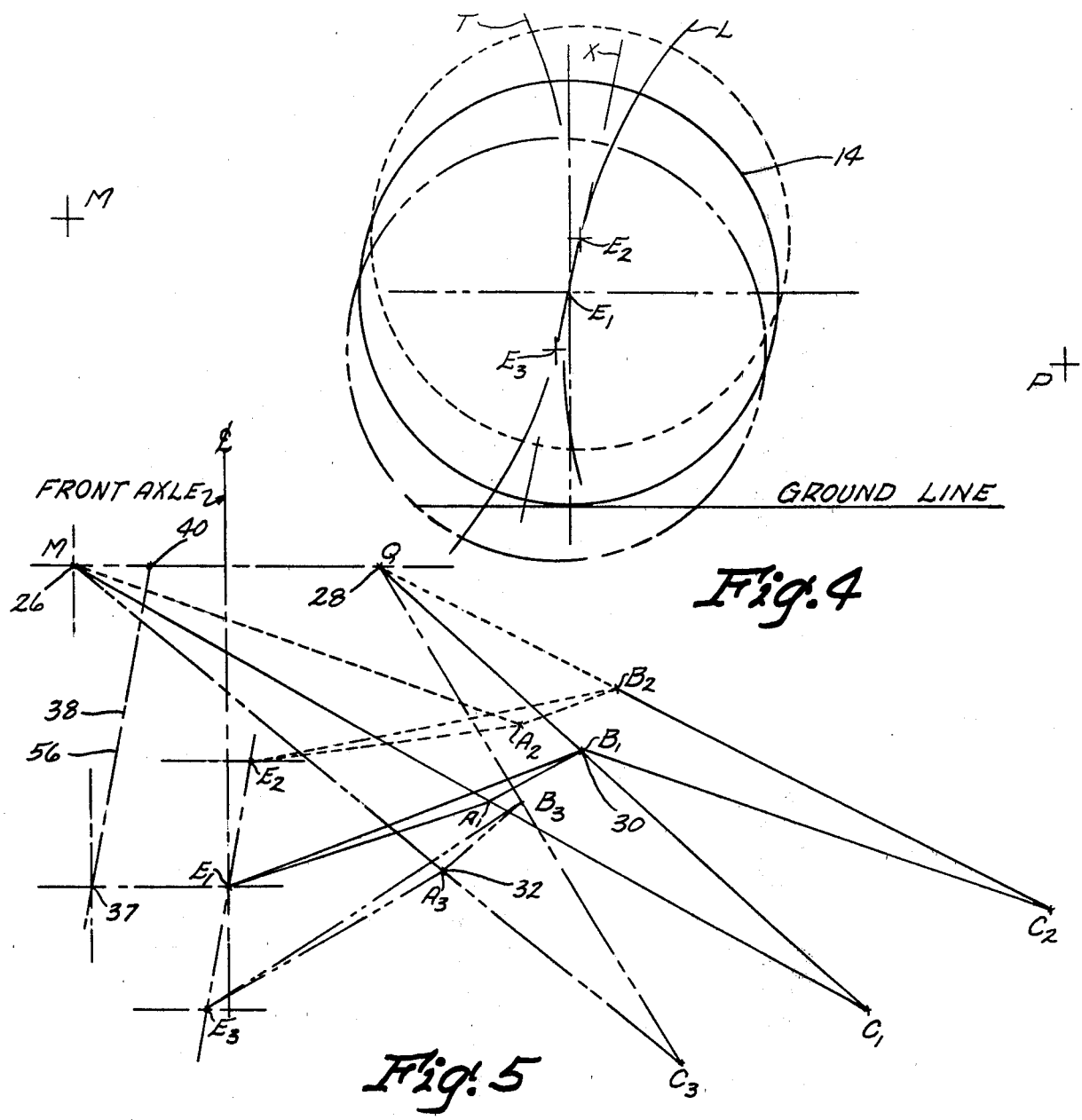
Fig. 4
Fig. 5
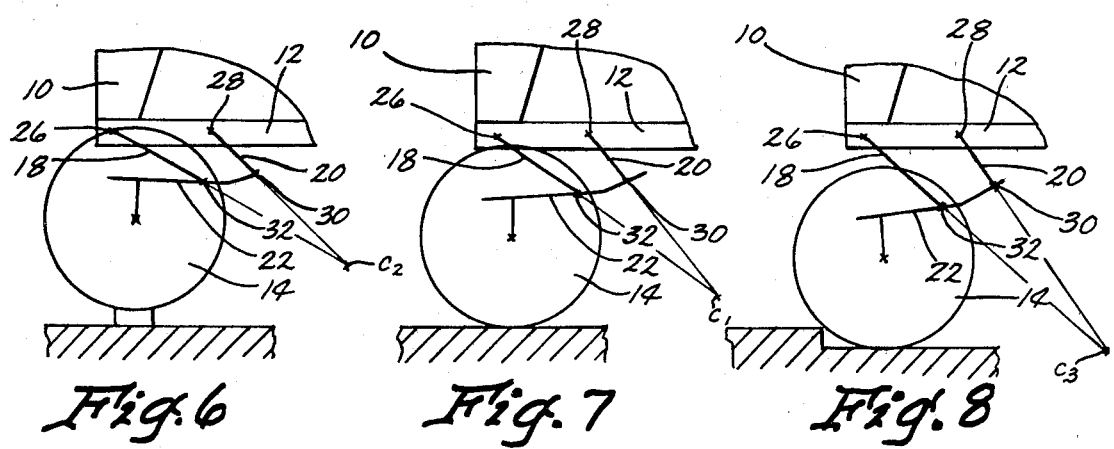
Fig. 6   Fig. 7   Fig. 8

FRONT AXLE SUSPENSION SYSTEM FOR A VEHICLE CHASSIS

BACKGROUND OF THE INVENTION

The present invention is directed generally to vehicle suspension systems and more particularly to a front axle suspension system for agricultural tractors and the like, which suspension system incorporates features of both the leading and trailing arm concepts.

Off-road vehicles such as agricultural wheel tractors or rubber-tired earth moving scrapers are designed to provide for a predetermined drawbar pull or tractive effort. Within the next ten years, it is expected that farming operations will be based on tractor working speeds of thirteen to sixteen kilometers per hour. But with the increased speed, size and power output of such vehicles, the operator is subjected to increasing levels of shock and vibration from the terrain and the attached implements. While improvements in operator station suspension systems and seat suspensions have increased convenience and comfort for the operator, such systems are believed to be incapable of sufficiently reducing operator fatigue under conditions of increased operating speeds.

Accordingly, a primary object of the invention is to provide a front axle suspension system which will improve the operator ride comfort.

A related object is to provide a front axle suspension system which reduces the loads transmitted to the chassis structure and operator's platform.

Another object is to provide a front axle suspension system which functions like an arm suspension system to minimize the unsprung mass of the vehicle.

Another object is to provide a front axle suspension system which incorporates operating features of both the leading and trailing arm concepts.

Another object is to provide a front axle suspension system which behaves like a leading arm suspension with variable geometry and with the instantaneous center thereof always being below the center of the front wheels.

SUMMARY OF THE INVENTION

The front axle suspension system of the present invention includes first and second links, each pivotally connected at its upper end to the vehicle chassis and extending downwardly therefrom for connection to a coupler link. The front axle is connected to the coupler link at a position forwardly of the pivotal connections to the first and second links. Finally, a dampener mechanism interconnects the vehicle chassis and coupler links to yieldably resist movement of the axle relative to the chassis. The pivotal connections of the first, second and coupler links are so arranged that the front axle is reciprocally movable in an upwardly and rearwardly inclined plane. The suspension system has a movable instantaneous center therefor which is at all times positioned below the centerline of the vehicle front wheels. The upwardly and rearwardly inclined planar movement of the front axle is advantageous for front wheel movements both in climbing out of a depression and overcoming surface obstacles. The fact that the instantaneous center of the suspension system is situated below the suspension links themselves and front wheel centerline provides improved ground clearance for the vehicle without sacrificing any of the shock reduction advantages of maintaining the suspension system pivot point below the axle centerline and as near as possible to the ground line.

BRIEF DESCRIPTION OF THE DRAWINGS

FIG. 1 is a side elevation view of an agricultural tractor equipped with the front axle suspension system of the invention;

FIG. 2 is an enlarged perspective view of the suspension system installed on the tractor of FIG. 1;

FIG. 3 is a partially fragmented perspective view of the suspension system;

FIG. 4 is a diagrammatic illustration of the extent of front wheel movement afforded by the suspension system;

FIG. 5 is a diagrammatic illustration of the range of movements of the suspension system elements;

FIG. 6 is a diagrammatic illustration of the suspension system in its fully extended position;

FIG. 7 is a diagrammatic illustration of the suspension system in an equilibrium position; and FIG. 8 is a diagrammatic illustration of the suspension system in its fully retracted position.

DESCRIPTION OF THE PREFERRED EMBODIMENT

Referring to FIG. 1, there is shown an agricultural tractor 10 having a chassis which includes the vehicle frame 12. The tractor front wheels 14 are supported on the chassis by the front axle suspension system of the present invention referred to generally by reference numeral 16.

The suspension system 16 includes a first link 18, a second link 20 and a coupler link 22. These links are pivotally connected with the vehicle frame 12 for motion as a four bar linkage. Referring to FIGS. 2 and 3, it is seen that a pair of four bar linkages are supported on opposite sides of the chassis 12 with the coupler links 22 interconnected by a cross member 24.

Specifically, the upper end of the first link 18 is pivotally connected to the chassis at 26 and the upper end of second link 20 is pivotally connected to the chassis at a position rearwardly thereof as at 28. The lower end of second link 20 is pivotally connected to a rear portion of coupler link 22 as at 30 and the lower end of first link 18 is pivotally connected to a medial portion of coupler link 22 as at 32. First link 18 is longer than second link 20 and positioned forwardly of it. Likewise, the distance between the upper pivotal connections 26 and 28 is greater than the distance between the lower pivotal connections at 30 and 32.

The coupler links 22 extend forwardly from pivotal connection 32 and are interconnected both by the crossbar 24 and a front crossbar 34. The latter is provided with forwardly extended flanges 36 which are each pivotally connected at 37 to the lower end of a dampener unit 38 that is pivotally connected at its upper end to the chassis at 40.

Crossbar 24 supports the vehicle front axle 42 (FIG. 3) for pivotal movement about a generally horizontal axis 44 directed longitudinally of the vehicle chassis. The front axle 42 is provided with an upstanding yoke 46 which is pivotally connected to the crossbar 24 by a pin 48. In FIG. 2 it is seen that opposite ends of the front axle 42 pivotally support spindles 50 which each carry a horizontally extended stub shaft 52 on which one of the front wheels 14 is rotatably mounted. The spindles are steerable in unison by linkage 54.

The range movement of the front wheels prescribed by the suspension system of the invention is shown in FIGS. 4 and 5. FIG. 4 illustrates that the suspension system incorporates features of both the leading and trailing arm concepts. A trailing arm suspension pivotable around the point M would prescribe the wheel movement as the circular arc T. A leading arm suspension pivotable about the point P, on the other hand, would prescribe the wheel movement as the circular arc L. Arcs T and L intersect at point E1 and a line X is drawn through E1 and tangent to arcs L and T at point E2 and E3. The straight line segment E3-E1-E2 prescribes the path of movement of the tractor front wheel 14. Whereas the leading arm concept allows the wheel to swing upward and rearward as it climbs over a bump, the trailing arm concept allows the wheel to swing upward and rearward when climbing out of a depression. Only the hybrid suspension system of the present invention enables an upward and rearward movement of the vehicle wheel in both situations. The advantage of the upward and rearward response of the front wheel when encountering an obstruction is that it dampens rather than accelerates the movement or reaction of the vehicle chassis.

Referring to FIG. 5, the pivotal connections at 26, 28, 30 and 32 are represented as M, Q, B and A respectively. With the front suspension 16 in its equilibrium position, i.e. with the tractor supported on the front wheels either at rest or traversing perfectly flat ground, the first and second links 18 and 20 are positioned as indicated in solid lines with the lower pivotal connections positioned at A1 and B1. Point E1 corresponds to the centerline of front wheel 14. Note that the instantaneous center of the suspension system in its equilibrium position is situated at point C1, well below and rearwardly of the front wheel centerline E1. The instantaneous center may be defined as a point on one link about which some other link is rotating or a point common to two links having the same linear velocity magnitude and direction. Thus point C1 is the imaginary point of intersection of the first and second links 18 and 20.

Linkage M, A2, B2, Q represents the suspension position when the front wheel is on a 100 millimeter bump and the chassis is level. Linkage M, A3, B3, Q, on the other hand, represents the suspension position when the front wheel is in a 100 millimeter depression and the chassis is level. Points C2 and C3 indicate the instantaneous centers for the links MA and QB at the latter linkage positions, respectively. This, in essence, allows the points E1, E2 and E3 to be also rotated about points C1, C2 and C3 respectively so that the front suspension behaves like a leading arm suspension with variable geometry and with the pivot pin below the front wheel centerline at all times.

For clarity, FIGS. 6, 7 and 8 diagrammatically illustrate the suspension position when the front wheel centerline is situated at points E3, E1 and E2 respectively. In each instance, it is seen that the instantaneous center is situated below and rearwardly of the front wheel centerline.

The line of action of the spring dampener units 38 is indicated in FIG. 5 at 56, the same being parallel to the three-point straight line path of the front wheel indicated at E3-E1-E2. This orientation maximizes the damping of induced motion. Whereas the spring dampener units 38 are shown in the drawings as semi-active hydro-pneumatic ride cylinders which allow the operator to change the spring stiffness and damping to alter the ride comfort for varying terrain, conventional coil springs and telescoping shock absorbers may be substituted in other embodiments.

The suspension system of the present invention thus provides for movement of the front axle in an upwardly and rearwardly inclined plane in response to pivotal movement of the four bar linkages defined by the first, second and coupler links. Whereas such planar movement presupposes a horizontal orientation for the front axle, it is apparent that the same operative effect is achieved when only one front wheel encounters an obstruction. In other words, even when the front axle pivots about axis 44, the pivot point is movable along the plane of movement for the front axle.

Thus there has been shown and described a front axle suspension system which accomplishes all of the stated objects.

I claim:

1. A front axle suspension system for an agricultural tractor chassis having forward and rearward ends and a longitudinal axis, comprising, first and second pairs of links, each link having upper and lower ends and each pair of links being pivotally secured at their upper ends to opposite sides of said chassis and said pairs of links being adapted to pivot in unison about substantially horizontal axes transverse to the longitudinal axis of said chassis, said second pair of links being positioned rearwardly of said first pair of links, a coupler pivotally connected to the lower ends of said first and second pairs of links and extending forwardly therefrom, a generally horizontal front axle connected to said coupler link, means for mounting at least one wheel on said front axle for rotation about a generally horizontal wheel centerline, and a dampener means interconnecting said coupler link and chassis to yieldably resist movement of said axle relative to said chassis, the pivotal connections of said first and second pairs of links and said coupler link being so arranged that the instantaneous center of said suspension system in moveable in response to pivotal movement of said first and second pairs of links and said coupler link and will always be below and rearwardly of said wheel centerline and said first and second pairs of links and said coupler link being so arranged that said horizontal axle is reciprocally moveable in an upwardly and rearwardly inclined plane relative to said chassis in response to pivotal movement of said links.

2. The suspension system of claim 1 wherein the line of action of said dampener means is parallel to said plane.

3. The suspension system of claim 1 wherein the distance between pivotal connections at opposite ends of said first pair of link is greater than the distance between the pivotal connections at opposite ends of said second pair of link.

4. The suspension system of claim 3 wherein the pivotal connections at the upper ends of said first and second pairs of links are arranged in a generally horizontal plane, said first and second pairs of links extending downwardly and rearwardly from the upper ends thereof, and the pivotal connections at the lower ends of said first and second pairs of links being arranged in a forwardly and downwardly inclined plane.

* * * * *